United States Patent [19]

Ito

[11] Patent Number: 4,870,874
[45] Date of Patent: Oct. 3, 1989

[54] STARTING AND REVERSE TRANSMISSION APPARATUS

[75] Inventor: Toshifumi Ito, Saitama, Japan

[73] Assignee: Honda Giken Kogyo Kabushiki Kaisha, Tokyo, Japan

[21] Appl. No.: 106,270

[22] Filed: Oct. 9, 1987

[30] Foreign Application Priority Data

Oct. 11, 1986 [JP] Japan .................................. 61-241778

[51] Int. Cl.⁴ .......................... F16H 37/06; F16H 5/52; F02N 15/02
[52] U.S. Cl. .................................... 74/665 T; 74/674; 74/661; 74/810; 74/404; 74/7 E; 180/219
[58] Field of Search ......... 180/219; 74/665 A, 665 T, 74/665 P, 665 Q, 404, 674, 7 E, 421 A, 661, 810

[56] References Cited

U.S. PATENT DOCUMENTS 2,588,462  3/1952  Baker et al. ..................... 74/674 X
4,513,827  4/1985  Dubiel ............................. 74/674 X
4,590,811  5/1986  Kasubuchi ........................ 74/7 E
4,635,489  1/1987  Imamura et al. ................... 74/7 E
4,763,538  8/1988  Fujita et al. ..................... 74/6

FOREIGN PATENT DOCUMENTS

2184406  6/1987  United Kingdom ................ 180/219
2185946  7/1987  United Kingdom ................ 180/219

Primary Examiner—Leslie A. Braun
Assistant Examiner—Christopher Campbell
Attorney, Agent, or Firm—Lyon & Lyon

[57] ABSTRACT

A power transmission, particularly adapted for motorcycle application, in which a first planetary gear reduction system reduces power output from the starter motor for starting the engine and a second planetary gear reduction system operated in cooperation with the first system enables power output from the starter motor to operate the vehicle in reverse.

5 Claims, 6 Drawing Sheets fig. 1.

STARTING AND REVERSE TRANSMISSION APPARATUS

BACKGROUND OF THE INVENTION

The present invention relates to vehicle power transmissions. More particularly, the invention relates to a power transmission uniquely adapted for use in motorcycles to enable reverse operation of the vehicle by means of power obtained from the starter motor.

Motorcycles are typically sufficiently light in weight that they can be readily maneuvered manually for slight movement, either forwardly or in reverse, as, for example, may be required in a garage or parking lot for parking purposes.

In these vehicles, therefore, since powered maneuvering has generally not been required, attempts have not been made to utilize either the mechanical or electrical power available on the vehicles for reverse operation, however slight.

More recently, however, with the significant increase in the size and weight of motorcycle-type vehicles it becomes desirable to provide such vehicles with the ability to move in reverse under power. Utilization of typical reverse gearing driven by the power unit of the vehicle is not conveniently available for this purpose, however, since the contemplated vehicle maneuvering is difficult to perform unless the speed of the vehicle when operating in reverse is slight. Consequently, any transmission of heretofore known-type used for such purpose would, of necessity, require a large reduction ratio and would, therefore, be unduly large in size and weight and too complicated in structure to effectively accomplish the desired result.

In Japanese Patent Application No. 60-238643 to the assignee herein there is described a device adapted to reverse a starter motor and to transmit the power to the output shaft after reducing the reverse revolution. This device has the convenience that it can reverse the vehicle by only operating a switch. On the other hand, however, use of the starter motor in this manner requires significant changes in the electric system of the starting device in order to rotate the starter motor output shaft forwardly or reversely. Further, because the reverse reduction device comprises a pinion and a gear, for slight reverse speed of the vehicle, the gear reduction system becomes considerably large in size and weight.

Compounding the problem is the fact that it is advantageous to rotate the starter motor at a high speed in respect to its output characteristic and consumption of electric power. When such motors are driven at high speeds, however, it is necessary to increase the reduction ratio of the starting system. For this reason it is necessary to provide a further reduction device whereby there is an inconvenience in that the size of the power unit must be increased.

SUMMARY OF THE INVENTION

The present invention contemplates an arrangement in which transmission of power to the starting system is effected by properly reducing the output of a starter motor rotating at a high speed in one direction without substantial changes to the transmission and the starting circuit as currently used in the prior art, and further, transmission of power to a reverse driving system of the vehicle after highly reducing the power output of the starter motor. More particularly, the present invention contemplates a power transmission apparatus for a vehicle effective to operate the vehicle in a starting mode of operation and in a reversing mode of operation, comprising a starter motor having an output shaft; a starting drive; a reversing drive; a first gear reduction system for operatively interconnecting the starter motor output shaft and the starting drive; a second gear reduction system for operatively interconnecting the starter motor output shaft and the reversing drive; and means for selectively connecting the first gear reduction system and the second gear reduction system to the starter motor.

By means of the invention the rotation of the starter motor is reduced in one step by the first planetary reducing device and transmitted to the starting system. For reverse operation, however, the rotation of the starter motor is reduced by two steps in the planetary reducing apparatus and transmitted to the reverse driving system of the vehicle. Accordingly, the starting system can be rotated at an appropriate speed although the starting motor is a motor which rotates at a high speed. Also, the reverse driving system can be operated at a greatly reduced speed and this reverse operation can be effected by simply closing the starting switch as when starting.

For a better understanding of the invention, its operating advantages and the specific objects obtained by its use, reference should be made to the accompanying drawings and description which relate to a preferred embodiment of the invention.

DESCRIPTION OF A PREFERRED EMBODIMENT OF THE INVENTION

Figure 1:
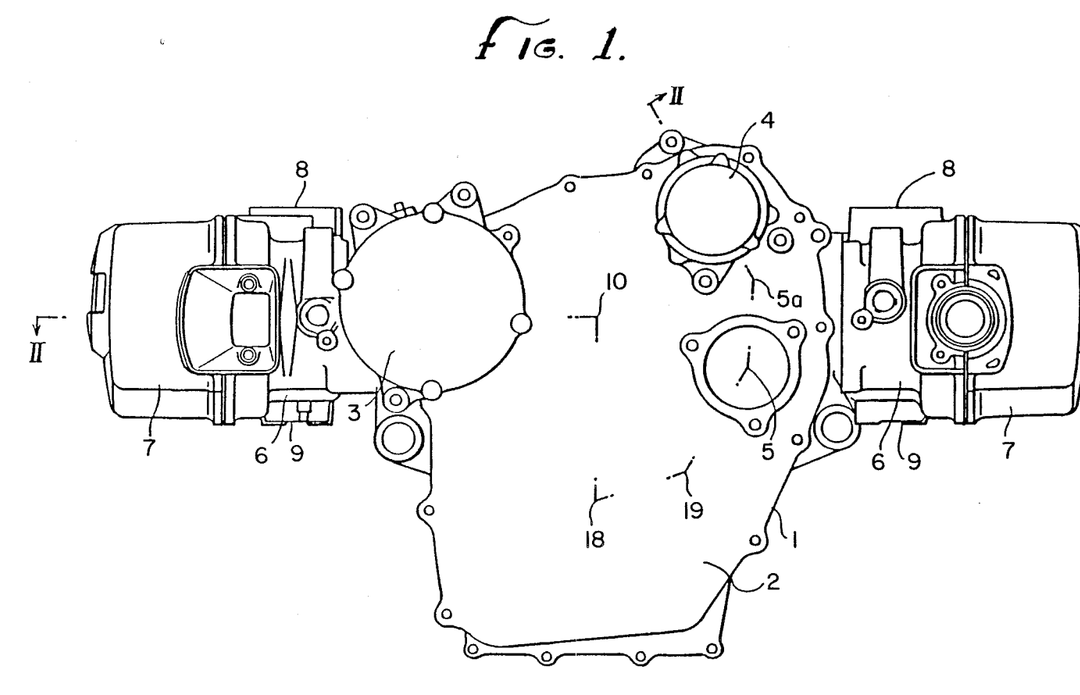
FIG. 1 is an elevational view of the housing of a power unit adapted for practice of the present invention.

In FIG. 1, reference numerals identify at 1 a housing of a power unit, at 2 a clutch cover, at 3 an alternator, at 4 a starter motor and at 5 a hole for attaching an output bearing. At opposite ends of the housing 1 are provided aligned cylinder heads 6, 6 and covers 7, 7. Reference numerals 8 indicate an intake port of the cylinder head 6, 9 an exhaust port, and 10 a center point of a crank shaft.

Figure 2:
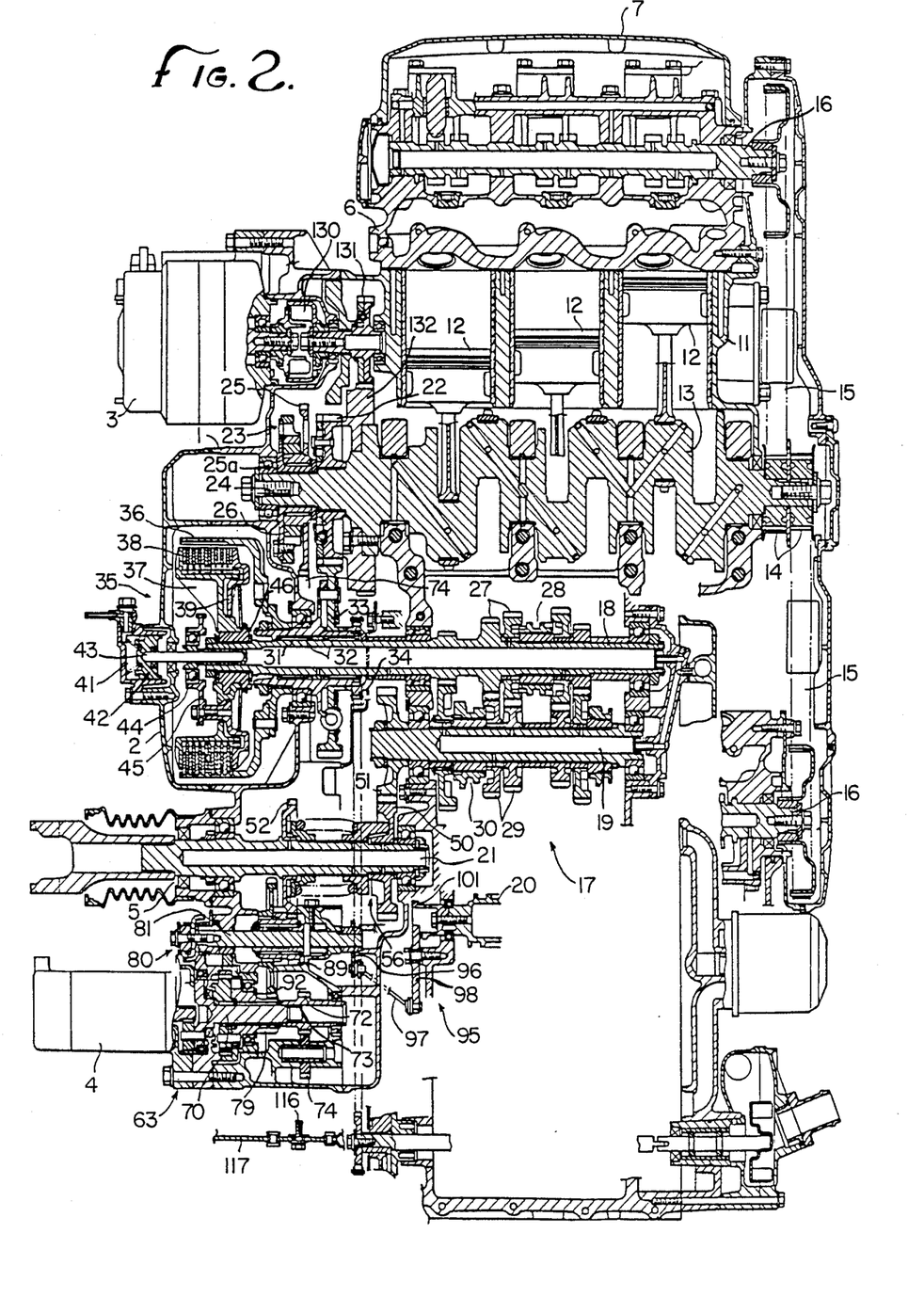
FIG. 2 is a sectional view taken along line II—II of FIG. 1.

The cylinder block 11, as shown in FIG. 2, has inserted therein three pistons 12 which are connected to the crank shaft 13. Cam shafts 16, 16 on both sides of the block 11 are driven by two pulleys 14, 14 shown to be fixed at the right hand end, that is, to a front end of the crank shaft 13, through the intermediary of timing belts 15, 15.

In the housing 1 are supported, as in the prior art device, a main shaft 18 of a transmission 17 parallel to the crank shaft 13, a counter shaft 19, a shift drum 20 and an output shaft 21. On the left end of the crank shaft 13, are fixed an output gear 22 and a boss 24 of one way clutch 23 for starting. On the boss 24 is loosely fitted a sleeve 25a integral with a starting input gear 25. Between a ring integral with the boss 24 and the sleeve 25a is interposed a one way transmitting element 26 whereby, on starting, the crank shaft 13 is driven via the gear 25, the element 26 and the boss 24. After starting, the starting input gear 25 stops, but the crank shaft 13 continues to rotate by means of the one way clutch 23 without restricting its direction of rotation.

On the main shaft 18 of the transmission 17 are provided transmission gears 27 and clutch 28, as in the prior art device, and on the counter shaft 19 are provided transmission gears 29 and a clutch 30. Also, at the left side of the main shaft 18 is rotatably supported by needle bearings 32 a clutch input sleeve 31. On the clutch input sleeve 31 are a clutch input gear 33, a sprocket 34 for driving an oil pump, and an input member 36 of a main clutch 35.

The main clutch 35 is constituted by a large number of alternately arranged friction plates 38 that engage input member 36 and output member 37 to transmit to the main shaft 18 the rotation transmitted from the gear 29 and the sleeve 31 forcing the friction plates 38 into mutual engagement by means of pressurizing plate 39 and plate spring 40.

On the clutch cover 2 is provided an oil cylinder 41 operative to apply pressure which allows a piston 42, a rod 43, a bearing 44 and a release plate 45 to move to the right as viewed in FIG. 2. The operating force of the friction plates 38 can be released by supplying oil pressure to allow the pressurizing plate 39 to move toward the right. The output member 37 is fixed to the main shaft 18 through the intermediary of the boss 46.

On the right end of the output shaft 21 is loosely fitted a driven gear 50 which meshes with an output gear 51 fixed to the left end of the counter shaft 19. Further, on the output shaft 21 is loosely fitted a reverse driven gear 52 which is driven when the transmission system is in its reversing mode. On splines 53 (FIG. 3) of the output shaft 21 are fitted sliders 54, 55 urged toward opposite sides by means of a compressing spring 53a to form a cam damper 56 by the driven gear 50 and the slider 54. The cam damper is formed by convex and concave surfaces having projections 58, 59 on side surfaces of the gear 50 and the slider 54 to mesh the convex and concave surfaces with each other. By percussive load or reverse torque applied to the projection 59, the projection is displaced along an inclined side surface of the projection 58 whereby the cam damper effects the damping function by the reverse and relative rotation of the slider 54.

Figure 3:
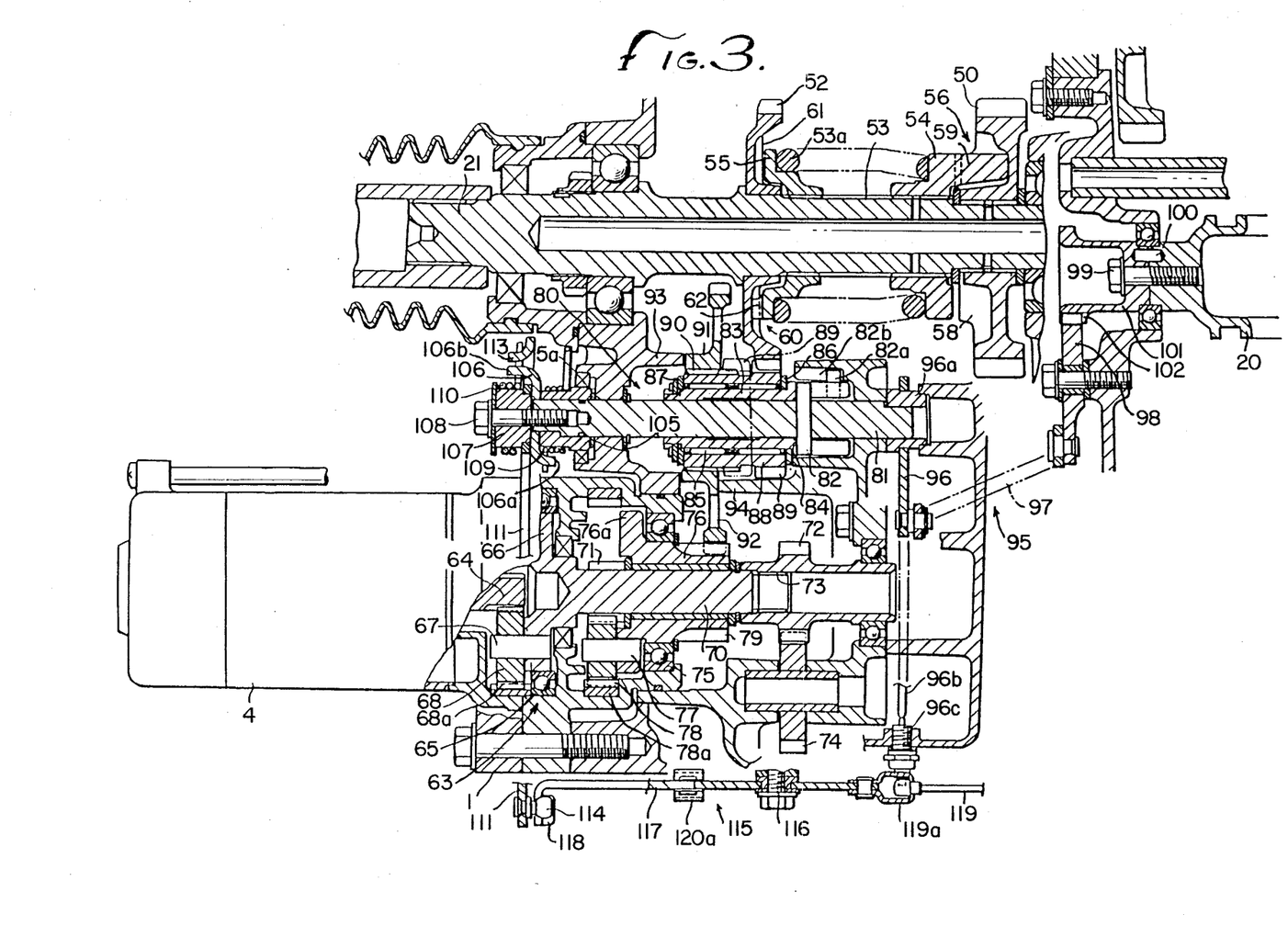
FIG. 3 is an enlarged sectional view illustrating the reverse driving system of the present invention.

Between the reverse driven gear 52 and the slide 55 is formed a torque limiter 60 which is constituted by meshing of large, shallow convex and concave portions 61, 62 formed on the gear 52 and the slider 55, respectively.

The output of the starter motor 4, as seen from FIG. 3, is transmitted to a two step planetary reducing device 63 and reduced at each of the two steps provided thereby. The output at the first, or front step is transmitted to the starting system and the output of the second, or rear step, is reduced by two steps before being transmitted to the reverse system to drive it at a low speed.

The front step planetary reducing device is constituted by a sun gear 64 mounted on a rotary shaft of the starter motor 4, a planetary gear 68 supported by means of a pin 67 on a carrier 66 supported by a bearing 65, and a ring gear 68a fixed on the housing. The output side of the carrier 66 forms a starting shaft 70 which attaches the rear step sun gear 71 and which connects a starting gear 72 by means of a spline 73. The starting shaft 70 drives the starting input gear 25 (FIG. 2) through the intermediary of an idler 74.

The rear step planetary reducing device is constituted by the sun gear 71, a hollow reverse output shaft 76 which is loosely fitted on the starting shaft 70 and which is supported by a bearing 75 from outside, a planetary gear 78 supported by means of a pin 77 on a carrier 76a integral with the output shaft 76, and a ring gear 78a fixed in the housing 1. The rear step planetary reducing device reduces the velocity of rotation of the sun gear 71, which has been reduced initially in the front step, and transmits the rotational force to the reverse output shaft 76 on which a reverse driving gear 79 is cut.

Figure 4:
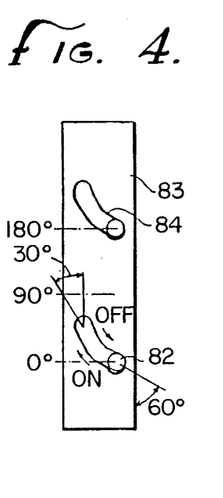
FIG. 4 is a developed view of a reversing drum employed in the present invention.
Figure 5:
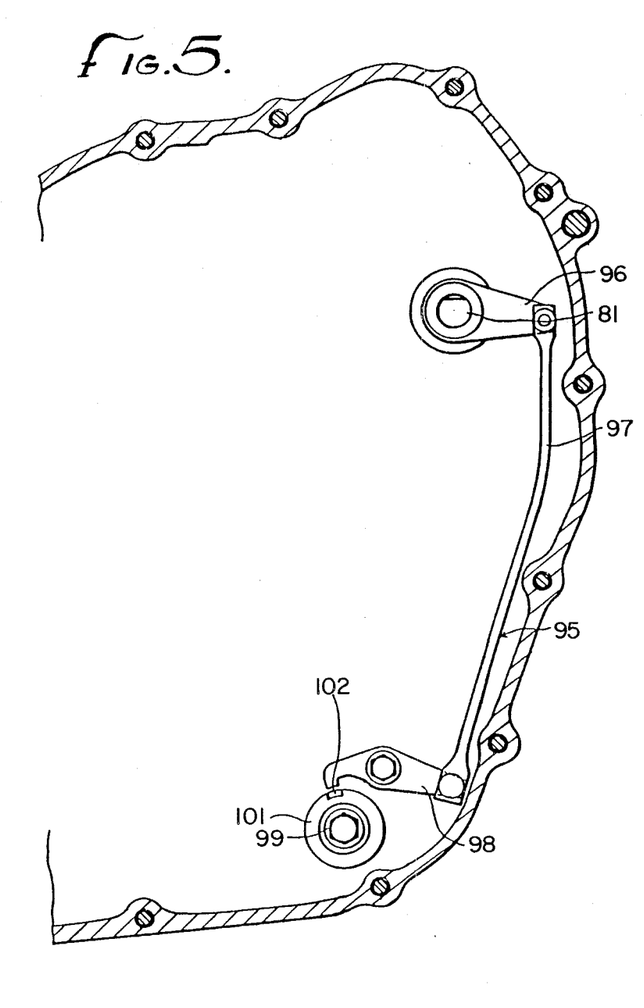
FIG. 5 is a front view illustrating a safety device connecting to a reversing clutch in the present invention.

A reverse clutch device 80 is provided intermediate the starting shaft 70 and the final output shaft 21 to transmit the rotation of the reverse driving gear 79 to the output shaft 21. A reverse driving system is constituted by the device 80 and the second step of the planetary reducing device 63. The reverse driven gear 52 is driven by the device, indicated generally as 80, which has a reverse shaft 81, a pin 82 and a reverse drum 83 with a slant groove 84. The pin 82 and the slant groove 84 cooperate to form, as shown in FIG. 4, a cam transmission mechanism which is linearly guided by a further pin 82a and a groove 82b of the housing whereby the reverse drum 83 is displaced in the axial direction by the rotation of the reverse shaft 81. On the drum 83 is rotatably mounted a sleeve 88 by means of a needle bearing 85 and rings 86, 87. On the outer periphery of the sleeve 88 are cut a slide gear 89 and a spline 90, by means of the latter of which an operatively connecting gear 92 is mounted. Accordingly, when the reverse shaft 81 is rotated, the reverse drum 83 is displaced in the axial direction. Also, the slide gear 89 mounted on the reverse drum 83 moves axially thereby to mesh with, or to disengage from, the reverse driven gear 52 on the output shaft. In this time, the operatively connecting gear 92 is prevented from being displaced axially by means of projections 93, 94 extending from the housing 1. The operatively connecting gear 92 thus continues its rotation because the reverse driving gear 79 is always meshing therewith. By this continued rotational movement, the slide gear 89 also continues to always rotate.

In order that the reverse shaft 81 can displace the slide gear 89 into meshing relation with the reverse driven gear 52 only at a neutral position of the transmission 17, an inhibiting device, indicated generally at 95, is interposed between the reverse shaft 81 and the transmission 17. As shown in FIG. 3, a lever 96 is fixed to the reverse shaft 81 by means of a boss portion 96a and is connected to a pawl 98 pivoted by a link 97. In the shift drum 20 is provided a groove 102 of a rocker 101 fixed by a pin 100. The arrangement is such that, when the shift drum 20 of the transmission 17 is in the neutral position, the pawl 98 falls into the groove 102. The slide gear 89 thus meshes with the reverse driven ar 52 only when the pawl has fallen into the groove 102. In order to indicate that the apparatus is in the reversing condition a cam 96b is provided on the lever 96 and a reverse switch 96c, actuated by the cam, is fixed on the housing 1 whereby a signal is transmitted to an indicator on a meter panel by means of actuation of the reverse switch 96c.

Figure 6:
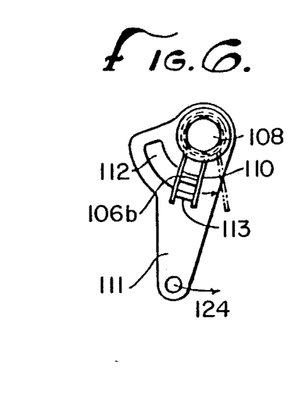
FIG. 6 is an elevational view of a reversing arm according to the present invention.

On the left end of the reverse shaft 81 are fixed by a threaded screw 108 a collar 105, a racket 106 and a collar 107. On an inner finger portion 106a of the bracket 106 engages a return spring 109 to input the rotary force to the reverse shaft 81 whereby the reverse drum 83 is urged to its left hand position. On the collar 107 is loosely fitted a further spring 110 which engages both sides of an outer finger 106b of the bracket 106 as shown in FIG. 6.

The collar 107 also pivotally mounts a reverse arm 111 which is provided with a slot 112 and a pushing finger 113. The finger portion 106b of the bracket 106 projects from the slot 112. The finger portion 106b and the pushing finger 113 are forcedly interposed between two legs of the spring 110.

Figure 7:
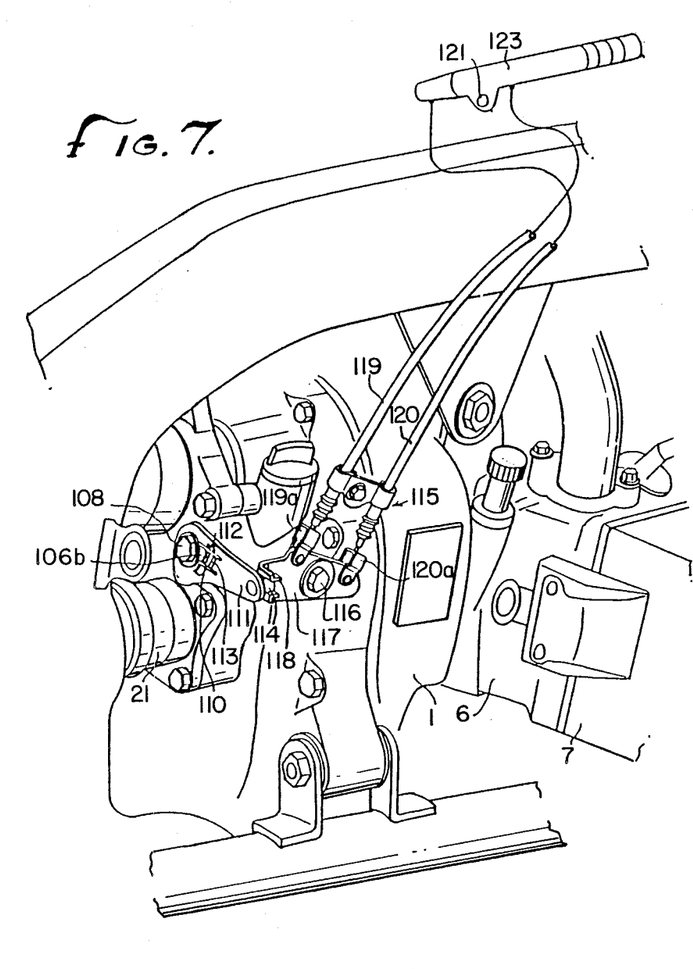
FIG. 7 is a perspective view of a reversing shifter according to the present invention.
Figure 8:
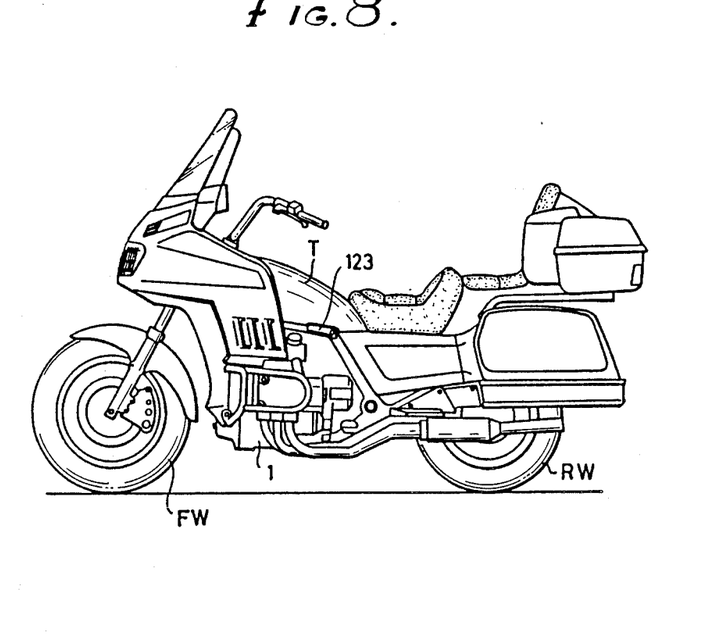
FIG. 8 is an elevational view of a motorcycle utilizing the present invention.

The reverse arm 111, as shown in the lowermost position of FIG. 3 and in FIG. 7, is operated by a pivot 114 which connects a reverse shifter 115. The reverse shifter 115 comprises a lever 117, which is pivotally mounted on the housing 1 by a pin 116, and which is adapted to engage the pivot 114 between a pair of lugs 118. The lever 117 is pivoted by cables 119, 120 which are connected to the lever 117 at both sides of the pin 116 by means of connecting fittings 119a, 120a. A reverse handle 123, which is pivotally mounted on the vehicle body by a pin 121, connects each of the other ends of the cables to operate the lever 117. As shown in FIG. 8, the reverse handle 123 is arranged in a recess in a side of the vehicle body, for example, below the fuel tank T, from whence it can be withdrawn.

The reverse operation is thus effected by drawing the reverse handle 123 out of the recess toward the side and by pulling it up. When the reverse handle 123 is thus moved to the reverse side, the reverse arm 111 is pivoted in the direction of arrow 124 in FIG. 6 by means of the lever 117 of the reverse shifter 115. One leg of the spring 110 is moved by the pushing finger 113 in the same direction, and the finger portion 106b is pressed by the other leg of the spring in the same direction. Accordingly, the reverse shaft 81 also is subjected to a rotary torque of the same direction by the bracket 106.

In operation, if the transmission and, therefore, the shift drum 20 are in the neutral position, the lever 96 is rotated by the reverse shaft 81 and the pawl 98 is caused to fall into the groove 102 of the rocker 101 through the intermediary of the link 97 to lock the shift drum 20 in its neutral position. Simultaneously, the reverse drum 83 is advanced by the pin 82 whereby the slide gear 89 meshes with the reverse driven gear 52. In this state, when the switch of the starter motor 4 is actuated, rotation of the starter motor 4 is reduced by the two step planetary reducing device 63, and further, is reduced by combinations of the reverse driving gear 79 and the operatively connecting gear 92, and of the slide gear 89 and the reverse driven gear 52 whereby the output shaft 20 and, therefore, the drive wheel of the motorcycle is driven in reverse at a greatly reduced speed.

At this time, the starting shaft 70 is rotated by the front step planetary reducing device of the planetary reducing device 63, and the starting input gear 25 on the crank shaft 13 is rotated via the starting gear 72 and the idler 74. However, since its rotational speed is about 550 rpm and an idling rotational speed of the crank shaft 13 is about 800 rpm, interference of the starting system can be avoided by the one way clutch 23.

If the shift drum 20 is not in the neutral position, because the pawl 98 does not fall into the groove 102, when the reverse handle 123 is rotated, the movement is transmitted up to the reverse arm 111 and presses the finger portion 106b through the intermediary of the spring 110. However, the reverse shaft 81 of the reverse clutch device 80 will not rotate and, therefore, the slide gear 89 cannot be displaced. When, however, the shift drum 20 moves to the neutral position, the reverse shaft 81 is urged by the spring 110 to rotate and the slide gear 89 can then be meshed with the gear 52.

It will be appreciated that, due to the above-described arrangement, when normal starting is performed, the arrangement is adapted to deactivate the main clutch 35, to put the shift drum 20 in the neutral position, and to put the reverse handle 123 in its position of positive rotation. Accordingly, the reverse shaft 81 is caused to rotate in the non-operative position by the spring 110 and, at the same time, is pressed to the non-operative position by the return spring 109 and is stopped at the position. In this condition, if the starter motor 4 is actuated, the rotation is transmitted from the reverse motor gear 79 of the planetary reducing device 63 to the operatively connecting gear 92. However, because the slide gear 89 is in the left position, the reverse driven gear 52 will not be driven.

On the other hand, when rotation of the starter motor 4 is transmitted from the front step planetary device to the starting input gear 25 via the spline 73, the starting gear 72 and the idler 74, the engine can be started by rotating the crank shaft 13 through the intermediary of the one way clutch 23. After starting, the vehicle can move forwardly through the operation of the main clutch 35 and the shift drum 20.

When it is desired to run the vehicle in reverse, after stopping the vehicle, the transmission 17 is brought into the neutral position. Then, when the reverse handle 123 is rotated into its reversing position, the torque, as mentioned above, is transmitted from the lever 117, the reverse arm 111 and the spring 110 to the reverse shaft 81 and, further, to the lever 96 of the inhibitor 95, the link 97 and the pawl 98. By this action, the pawl 98 falls into the groove 102 of the rocker 102 integral with the shift drum 20, and locks the shift drum in its neutral position whereby the reverse shaft 81 is caused to rotate to a limited degree. By means of this movement the reverse clutch device 80 actuates and the drum 83 is moved forward by the pin 82 whereby the slide gear 89 is adapted to mesh with the reverse driven gear 52. Thus, when the starting switch is pushed and the starting motor 4 is energized, low speed revolutions, reduced by the two steps of the planetary reducing device 63, are transmitted as reverse revolutions to the output shaft 21 via the reverse driving gear 79, the operatively connecting gear 92, the slide gear 89, the reverse driven gear 52 and the torque limiter 60, whereby the vehicle can be reversed at a greatly reduced speed.

Further, in the disclosed apparatus the alternator 3 is always driven by the crank shaft 13 through the intermediary of a resilient joint 130 and gears 131 and 132.

It will be appreciated that, since the present invention uses a planetary reducing device as mentioned above, a high reduction ratio can be obtained by a device that is small in size. The invention further permits use, as a starter motor, of a motor which rotates advantageously at a high speed in regard to its output characteristics and the consumption of electric power. It also enables the entire device to be miniturized.

Since the present invention permits transmission to the reverse driving system of rotary motion that is highly reduced by the front and rear steps of the planetary reducing device, the vehicle can be operated in reverse at a greatly reduced speed by the operation of the starting switch, whereby vehicle handling becomes very easy.

Further, since the output shaft of the rear step of the planetary reducing device is hollow and, as a reverse output shaft, is concentric with the starting shaft which is the output shaft of the front step, the shaft supporting mechanism becomes simple and can be constituted in small size.

Although a preferred embodiment of the invention has been shown and described, it should be understood that various changes can be made therein without departing from the scope of the appended claims.

I claim:

1. Power transmission apparatus for a vehicle effective to operate said vehicle in a starting mode of operation and in a reversing mode of operation, comprising:
   a starter motor having an output shaft;
   a starting drive;
   a reversing drive;
   a first planetary gear reduction system for operatively interconnecting said starter motor output shaft and said starting drive;
   means for selectively connecting said first gear reduction system and said second gear reduction system to said starter motor; and
   said first and second gear reduction systems being arranged for operation in series when said starter motor output shaft is operatively interconnected with said reversing drive.

2. Power transmission apparatus for a vehicle effective to operate said vehicle in a starting mode of operation and in a reversing mode of operation, comprising:
   a starter motor having an output shaft;
   a starting drive;
   a reversing drive;
   a first gear reduction system for operatively interconnecting said starter motor output shaft and said starting drive, said first gear reduction system including:
      a sun gear formed on said starting motor output shaft,
      a first stationary gear,
      a planetary gear rotatably attached to a first rotatable carrier and meshing with said sun gear and said first ring gear, and
      said first rotatable carrier being arranged for connection with said starting drive;
   a second gear reduction system for operatively interconnecting said starter motor output shaft and said reversing drive; and
   means for selectively connected said first gear reduction system and said second gear reduction system to said starter motor.

3. The apparatus according to claim 2 in which said second gear reduction system includes:
   a second sun gear formed on said first rotatable carrier;
   a second stationary ring gear;
   a second planetary gear rotatably attached to a second rotatable carrier and meshing with said second sun gear and said second ring gear; and
   said second rotatable carrier being arranged for connection with said reversing drive.

4. The apparatus according to claim 3 in which said first rotatable carrier and said second rotatable carrier are disposed in concentric, telescoping relation.

5. The apparatus according to claim 4 including a selectively movable slide gear operative for interconnecting said second rotatable carrier and said reversing drive.

* * * * *

UNITED STATES PATENT AND TRADEMARK OFFICE
CERTIFICATE OF CORRECTION

PATENT NO. : 4,870,874
DATED : October 3, 1989
INVENTOR(S) : TOSHIFUMI ITO

It is certified that error appears in the above-identified patent and that said Letters Patent is hereby corrected as shown below:

In claim 1 (column 7) between lines 34 and 35, insert a paragraph as follows:

-- a second planetary gear reduction system for operatively interconnecting said starter motor output shaft and said reversing drive; --.

In claim 1, column 7, line 35, after "first" insert -- planetary --.

In claim 1, column 7, line 36, after "second" insert -- planetary --.

In claim 1, column 7, line 39, after "second" insert -- planetary --.

In claim 2, column 8, line 22, delete "connected" and insert therefor -- connecting --.

Signed and Sealed this

Eighth Day of January, 1991

Attest:

HARRY F. MANBECK, JR.

*Attesting Officer*  *Commissioner of Patents and Trademarks*